April 25, 1961 J. E. ESHBAUGH 2,981,095
PRESSURE TESTING APPARATUS
Filed March 28, 1957 2 Sheets-Sheet 2

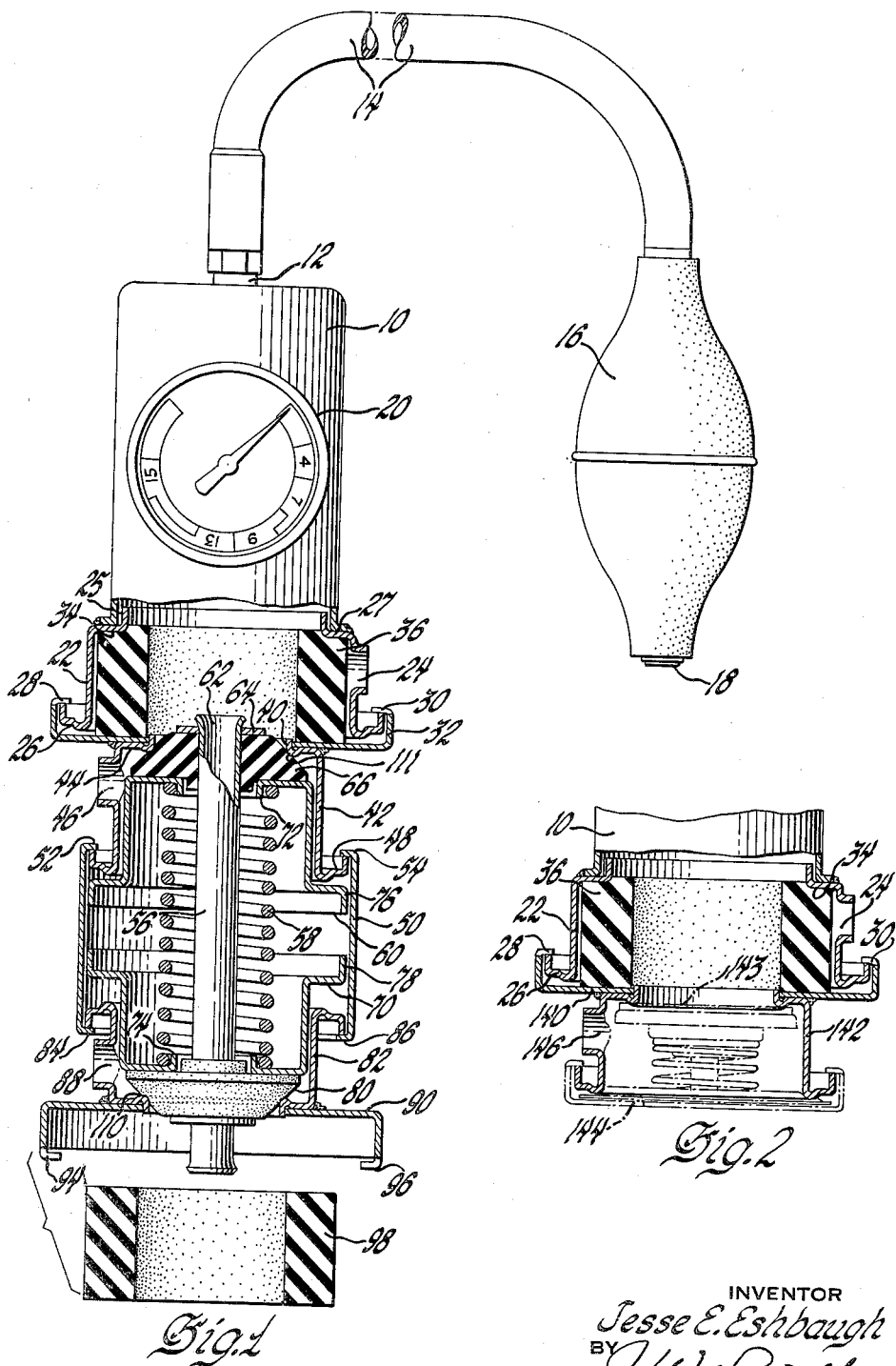

INVENTOR
Jesse E. Eshbaugh
BY J. W. Lovett
ATTORNEY

United States Patent Office 2,981,095
Patented Apr. 25, 1961

2,981,095

PRESSURE TESTING APPARATUS

Jesse E. Eshbaugh, Flint, Mich., assignor to General Motors Corporation, Detroit, Mich., a corporation of Delaware Filed Mar. 28, 1957, Ser. No. 649,220

2 Claims. (Cl. 73—40)

This invention relates to pressure testing apparatus and more specifically to apparatus for testing automotive radiators and pressure operated automotive radiators caps in order to determine the possible presence of leakages or structural weaknesses in such devices.

In modern automotive vehicles, including passenger cars and trucks, it is conventional practice to maintain the engine cooling medium under pressure in order to minimize evaporation of the coolant and to make the cooling system more efficient. In such systems each radiator is provided with a filler neck which is vented to the atmosphere by way of an overflow tube and sealed from the radiator proper by a spring loaded valve disc resiliently seated on an annular shoulder within the neck. This spring loaded valve disc is conventionally a part of the radiator cap which is removably attached to the filler neck to form a closure. If the radiator is designed to operate at a pressure of seven p.s.i., then the spring in the cap will yield when such pressure is exceeded and the disc will be unseated to relieve the excess pressure by way of the vent tube. A radiator cap of this type is disclosed in the United States Patent 2,582,209, granted January 8, 1952, in the names of L. Smith and D. Friend.

In the case of passenger cars the diameters of the radiator filler necks are generally kept to one dimension but their depths as measured from their open ends to the annular shoulders, mentioned above, are generally provided in either of two dimensions. Some of these necks are relatively short in depth and are herein termed "short radiator necks." Others have depths which are relatively long and are herein termed "long radiator necks." Truck radiator necks are generally rather short but are greater in diameter than necks employed for passenger cars.

A need has arisen for testing the engine cooling systems of passenger automobiles and trucks to determine whether the systems and their cap closures are capable, after a period of use or even when they are new, to retain the pressures for which the systems were designed. The caps generally include springs and soft valve seating materials in their structures and such springs or materials may deteriorate in use or may be defective because of some flaw in manufacture. An apparatus is desirable which could conveniently be employed in testing the caps as well as the cooling systems.

An object of the present invention is to provide an improved pressure testing apparatus by means of which the cooling systems and radiator caps employed on passenger cars and trucks may be tested to determine their capacity in retaining the desired cooling system pressures.

Another object of the invention is to provide an improved main adapter by means of which a testing apparatus may be connected to either a long neck or a short neck radiator.

To these ends, a feature of the present invention pertains to an accumulator chamber to which an air pump and gage means are connected and which may be readily attached to an automotive radiator filler neck and alternatively to a pressure operated cap adapted to fit that neck as a closure. One other feature of the invention is a main adapter including an axial tube and opposed spring loaded valve seats which yield with respect to the tube to seat on either short or long radiator necks. Another feature is a main adapter arranged to serve as a connecting conduit and having duplicate and opposed ends coaxial with spring means, tube and a sleeve to form a unit.

These and other important features of the invention will now be described in detail in the specification and then pointed out more particularly in the appended claims.

In the drawings:

Fig. 1 is an elevation view, partly exploded and partly in section, of tester apparatus assembled and ready for attachment to the neck of a truck radiator neck and embodying the present invention;

Fig. 2 is a view of a portion of the apparatus shown in Fig. 1 with a passenger car radiator cap shown in dot-and-dash lines as attached thereto by a member simulating a passenger car radiator short neck;

As stated above, Fig. 1 shows an assembly of parts constituting a testing apparatus and a separate element all of which may be attached to a truck radiator filler neck as a preliminary to the testing of the engine cooling system, and Fig. 6 shows those same parts as mounted on a truck radiator.

Figure 3:
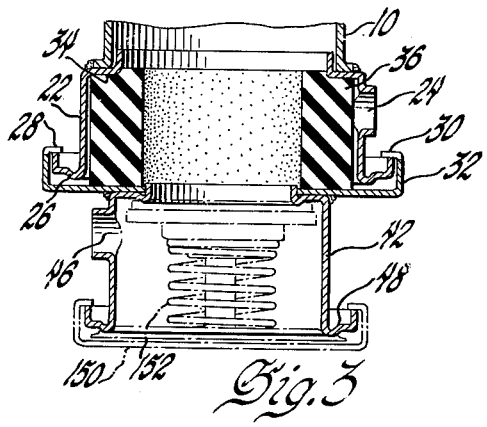
Fig. 3 is a view similar to that of Fig. 2, but utilizing a member to suit a passenger car radiator cap fitting passenger car long radiator necks.

The testing apparatus comprises an accumulator chamber 10 which, in the instant disclosure, is made of two parts permanently joined together although it may be of one piece construction. One end of the chamber 10 is enclosed except for a hub 12 providing an inlet for air flowing from a tube 14 by way of a one-way valve installed in the conduit close to the hub 12. This valve may be of the familiar type usually used in pneumatic tires. The other end of the flexible tube 14 is fitted with a rubber pressure bulb 16 in which is installed a one-way inlet valve 18. A pressure gage 20 is mounted on the side of the chamber 10 and is so connected to the interior of the latter as to register any pressure developed by use of the pump means 16. The gage is provided with numerals 4, 7, 9, 13 and 15 indicating the customary pressures to which systems and caps to be tested are to be subjected. Further description of the pump and gage means is not included herein as equivalent devices are shown in the United States Patent 1,764,616, granted June 17, 1930, to J. B. Fleming. Obbiously, a piston type air pump may be substituted for the bulb 16, if desired, and such a pump may be intimately assoicated in the structure of the chamber 10 without departing from the spirit of the present invention.

As stated heretofore, the chamber 10 is made in two parts the main portion being a cylinder with a closed end; and the other part is shown in each figure to constitute a main cup 22, a cylindrical wall portion of which has a side vent 24. One end of the main cup 22 is reduced in diameter as at 25 and forms a shoulder 27 to which the cylinder 10 is fixed by brazing. The other end of the cup 22 is provided with an out-turned cam sealing flange 26 conventionally in use on radiator filler necks and, therefore, simulates a radiator neck. Because of its diameter it is like a truck radiator neck. This flange 26 is suitably notched to receive the tongues 28 and 30 which are in-turned and diametrically opposed parts of a cup member 32. As the main cup 22 is of sheet metal, the formation of the exterior shoulder 28 thereon necessarily provides an annular inner shoulder 34 and, when the cup member 32 is removably fixed to the flange 26, a rubber cylinder 36 is caused tightly to seat between the shoulder 34 and the interior surface of the cup member 32. This seals off the vent 24 from the interior of the accumulator chamber 10. It will be appreciated that the tongues 28 and 30 act on notched cam surfaces as is conventional on radiator necks and as employed in the Patent 2,582,209 heretofore referred to.

The cup member 32 is centrally apertured to receive a cylindrical rim 40 of an adapter cup 42. The rim 40 is reduced in diameter compared with the major length of the cup 42 so that a radial portion 44 is formed which may be brazed or otherwise permanently fixed to the exterior of the cup member 32. The cup 42 is provided with a side vent 46 and also with an out-turned and notched cam flange 48 similar to, but smaller in diameter than, the flange 26. The cup member 32 and the simulated long radiator neck or adapter cup 42 constitute an integral adapter.

A cylinder or sleeve 50 is so proportioned as freely to surround the flange 48 and it provides opposed and inwardly directed tongues 52 and 54 for cooperating with the cam flange 48 as will be understood.

Coaxially related with respect to the adapter cup 42 and the sleeve 50 is a central tube 56, a helical spring 58 surrounding the tube and an inverted inner cup 60. The upper end of the tube 56 is flared out as at 62 thereby retaining a steel washer 64 and a frusto-conical, resilient sealing disc or washer 66 which is of rubbery material. The washer 64 and disc 66 are slidable on the tube 56. A cup 70 similar to cup 60 is also surrounded by the sleeve 50 but is placed in opposed relation with the cup 60 and the spring 58 is arranged to urge the two inner cups in opposite directions. The spring 58 is conveniently centered with respect to the tube 56 by a cylindrical flange 72 formed on the cup 60 and a similar flange 74 formed on the cup 70. The inner ends of the inner cups 60 and 70 are enlarged as at 76 and 78 but are free to move within the sleeve 50.

Figure 6:
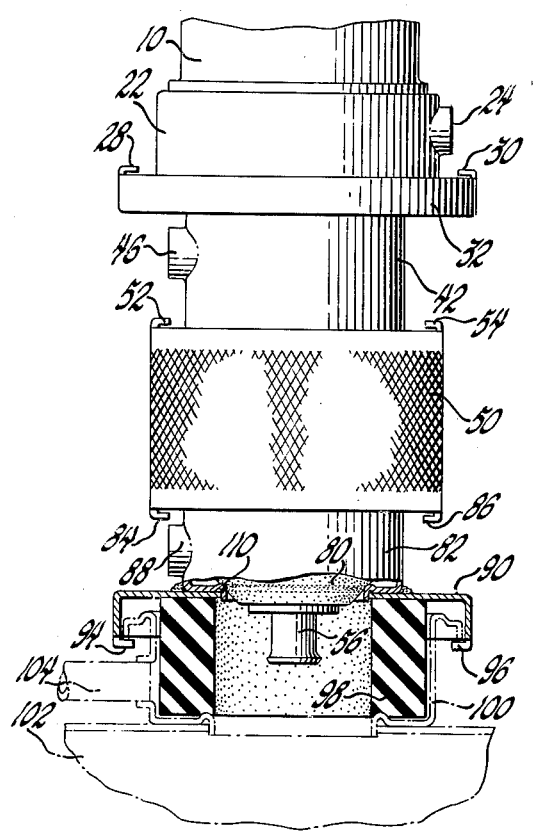
Fig. 6 is a view of parts shown in Fig. 1 and as positioned on a truck radiator neck.

Near the lower end of the tube 56 is a second frusto-conical rubber disc 80 which is identical to the disc 66 and similarly mounted on the tube 56. An adapter cup 82, which is similar to the adapter cup 42 but is of a shorter length to simulate a short radiator neck, is retained within the sleeve 50 by means of opposed tongues 84 and 86. It is also provided with an air vent 88 and is joined to a cup member 90 similar to the cup member 32 with the attendant inwardly directed tongues 94 and 96. A second cylindrical rubber insert 98 is provided. This is of the same dimensions as the rubber cylinder 36 and its use is illustrated in Fig. 6 wherein the cup member 90 is cammed into position on a short filler neck 100 of a truck radiator 102. As will be seen in Fig. 6, the rubber cylinder 98 is tightly locked in position to seal off the conventional vent pipe 104 leading from the truck radiator neck.

In Fig. 1 it will be seen that the cup member 32 and the adapter cup 42 are so joined as to form a unit readily detachable from the accumulator chamber 10 as well as from the main adapter structure of which the tube 56, spring 58 and sleeve 50 are parts. It will also be seen that the cup member 90 is permanently fixed to the adapter cup 82 to form an adapter unit which may be removed from the main adapter in the same way that the cups 32 and 42 may be removed.

Assuming that the radiator 102 of a truck is to be tested for leakage, the rubber cylinder 98 is inserted within the radiator neck 100, as shown in Fig. 6, and the adapter consisting of the integral 90 and 82 is cam locked in position on the neck to seal the vent pipe 104. The main adapter comprising the sleeve 50 and the two opposed inner cups 60 and 70, as well as the central tube 56 and spring 58 with the discs 66 and 80, is placed with one end inserted inside of the adapter cup 82. The sleeve 50 has its exterior knurled for conveniently turning it and locking it in place with respect to the adapter cup 82 utilizing the tongues 84 and 86 as the retaining means. When this is done the spring 58 will yield as the rubber disc 80 slides on the tube 56 and resiliently seats itself on the edge 110 of the adapter cup 82. The opening to the radiator 102 is thereby sealed not only because of the action of the spring seating the rubber disc on the edge 110, but also because the conical configuration of the disc 80 causes it to yield inwardly and tightly contact the smooth exterior surface of the tube 56.

Assuming that the rubber cylinder 36 is placed within the ring 22 of the accumulator chamber 10, as shown in Fig. 1, the cup parts 32 and 42 forming a unit adapter are joined to the flange 26 as shown and then the adapter cup 42 is inserted within the sleeve 50 and rotated to form the assembly as shown in Fig. 6. When this final step of assembly takes place the disc 66 will slide on the tube 56 and seat against the inner edge 111 of the adapter cup 42 and also against the exterior surface of the tube 56. In this connection it is to be noted that the enlarged portions 76 and 78 will be relieved of the loading of the spring 58 at this time for the discs 66 and 80 will become distorted by such loading in forming the opposed seals and the force of the spring 58 will be taken by the sleeve 50. It is also to be noted that with this arrangement it is immaterial whether the adapter cup 82 is long or short and the same is true with respect to the adapter cup 42 as the spring 58 makes allowance therefor. An operator need not select a particular end of the main or tube and spring adapter when making the connection with a particular adapter or radiator neck as the ends of the main adapter are identical.

With use of the bulb 16 pressure may then be built up in the truck radiator 102 until the proper pressure registers on the dial or gage 20. Assuming that the radiator cooling system is to operate at 7 p.s.i. pressure, the pumping action will be continued until 7 pounds is registered on the gage and, if a leak is present, the gage reading will drop. If the radiator and other parts of the cooling system are in good condition, the gage reading will be sustained. After the test the parts may be readily disconnected from the radiator.

Figure 4:
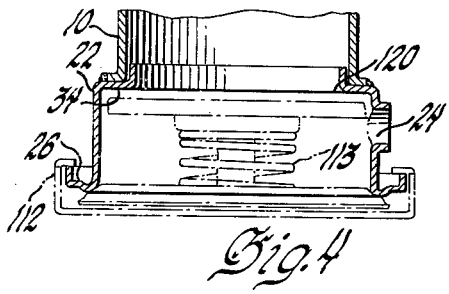
Fig. 4 is a sectional view through a part of the accumulator chamber shown in Fig. 1 with a truck radiator cap shown in dot-and-dash lines and positioned for testing.

A suitable pressure actuated cap 112 for mounting on the truck radiator neck 100 (Fig. 6) is shown in dot-and-dash lines in Fig. 4. This cap should be tested to determine its ability to withstand the required pressure and it, therefore, is connected to the flange 26 of the accumulator chamber 10 with its seat 120 forming a seal with the shoulder 34. The rubber ring 36 is discarded for this test. With use of the bulb 16 pressure is again built up in the chamber 10 until the desired radiator pressure is built up and, assuming that pressure is 7 pounds, the gage is again watched to see whether the cap is capable of sustaining that pressure. If the desired pressure is exceeded, the spring 113 forming a part of the cap should contract permitting unseating of the valve and venting of the air through the vent 24. Premature venting indicates a definite weakness in the cap and replacement may be in order.

In the event a short neck radiator cap for passenger cars is to be tested, then an adapter such as shown in Fig. 2 is employed. This adapter includes an apertured cup 140, which may be removably affixed to the main cup 22 of chamber 10, and an adapter cup 142 of appropriate dimensions to simulate a short radiator neck and accommodate a short neck radiator cap 144. The rubber cylinder 36 is employed to close off the vent 24 in the main cup 22 when the cup 140 is connected to the flange 26. A vent 146 in the cup 142 serves to vent air from the chamber 10 when the valve disc 143 of the cap 144 becomes unseated by the air pressure.

In Fig. 3 a passenger car long neck radiator cap 150 is positioned for testing. In this case, one of the adapters shown in Fig. 1 is employed as well as the ring 36. The adapter comprising the parts 32 and 42 is referred to. The spring 152 of the long neck radiator cap 150 being tested should yield at the set air pressure to vent air through the vent 46.

Figure 5:
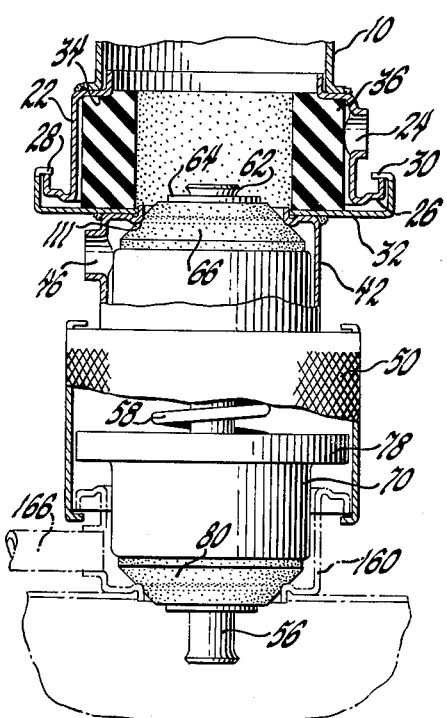
Fig. 5 is a view similar to that of Fig. 1, but sectionalized differently and connected to a passenger car short radiator neck.

In Fig. 5 a neck 160 of a passenger car radiator is shown and to this is attached one end of the main or spring and tube adapter of Fig. 1 to form a seal so that no air can escape from the radiator and through the overflow pipe 166. The ring 36 and the adapter using the parts 32 and 42, as shown in Fig. 1, are again employed to seal the vent 24 in the chamber 10. It will be noted that no rubber cylinder (such as cylinder 36 or 98 which are identical) need be employed in this situation insofar as the radiator neck 160 is concerned. It should also be noted that it is immaterial whether the neck 160 is of the short or the long type as the spring 58 will make allowance therefor. In using the pumping device, whether it be a bulb 16 or a piston pump, the operator may inadvertently cause some lateral movement of the chamber 10 and cause some air leakage by unseating of the disc 66 or 80. This is inconsequential, however, as the gage 20 is watched only after the required pressure is attained. The pumping action having ceased upon attainment of the pressure, the lateral action will cease and the undisturbed discs 66 and 80 will sustain the proper reading of the gage to give satisfactory test results.

From the above, it will be seen that a conventient testing apparatus is provided by means of which either caps or radiators may be tested with a minimum of confusion as to the requisite adapters to be employed for the variable diameters and depths of the units to be tested.

In the interest of clarity, it may be said that the apparatus includes "three coaxially arranged cups" 22, 42 and 82 (Figure 1 or Figure 6) or the "two oppositely disposed adapter cups" 42 and 82. The main cup 22 is permanently fixed to the chamber 10 so the adapter cups 42 and 82 may be considered as adequate connections for the main adapter which comprises the sleeve 50, the inner cups 60 and 70, the valve discs 66 and 80 and the tube 56.

I claim:

1. Pressure testing apparatus comprising an accumulator chamber, pump and gage means connected to said chamber for supplying air thereto under pressure, two oppositely disposed adapter cups defining through-passages and simulating radiator necks, one of said adapter cups being sealed to and communicating with said chamber, the other of said adapter cups having means for detachably affixing it to a radiator neck, a main adapter removably and coaxially connecting said adapter cups and including a central tube giving communication through said adapter cups, opposed valve discs and inner cups coaxial with and slidable on said tube, spring means under compression urging said inner cups and valve discs into positions closing said through-passages, each of said inner cups extending into one of said adapter cups and having an enlarged portion outside and between said adapter cups, and a sleeve slidably retaining said enlarged portion of each adapter cup and detachably joined to said adapter cups, the arrangement being such that said sleeve is placed in tension by said spring.

2. Pressure testing apparatus comprising an accumulator chamber, pump and gage means connected to said chamber for securing a desired testing air pressure in said chamber, three coaxial cups defining through-passages and simulating radiator necks, one of said three cups being a main cup permanently fixed to said chamber and communicating therewith, a rubber annulus arranged in said main cup as a seal, means cooperating with said rubber annulus in yieldingly and detachably securing a second of said three cups to said main cup, means for detachably securing a third of said three cups to a radiator neck, said second and third cups being oppositely disposed, a main adapter comprising opposed valve discs and inner cups slidable on a tube with the latter defining a passage from the interior of said main cup and through said main adapter, said inner cups having enlarged portions, spring means urging said cups and valve discs to positions closing the through-passages of the second and third cups, closure flanges on the second and third cups, a sleeve slidably receiving the said enlarged portions and flanges, and means detachably joining opposite ends of the sleeve to the closure flanges of the second and third cups, said sleeve being under tension due to the said spring means.

References Cited in the file of this patent
UNITED STATES PATENTS

| D. 176,261 | Hughes | Dec. 6, 1955 |
| 2,189,221 | Paine et al. | Feb. 6, 1940 |
| 2,446,219 | Eaton | Aug. 3, 1948 |
| 2,760,367 | Stomberg | Aug. 28, 1956 |
| 2,940,301 | Hughes | June 14, 1960 |

OTHER REFERENCES

Publication, "Pres-sure Tite Tester," Pressure Tite Products, Detroit, Michigan, 2 pages.